May 9, 1967

S. E. ZOCHOLL ETAL 3,319,127

STATIC OVERCURRENT RELAY

Filed Oct. 12, 1964

INVENTORS
STANLEY E. ZOCHOLL
JAMES W. LIPNITZ
BY

OSTROLENK, FABER, GERB & SOFFEN

ATTORNEYS

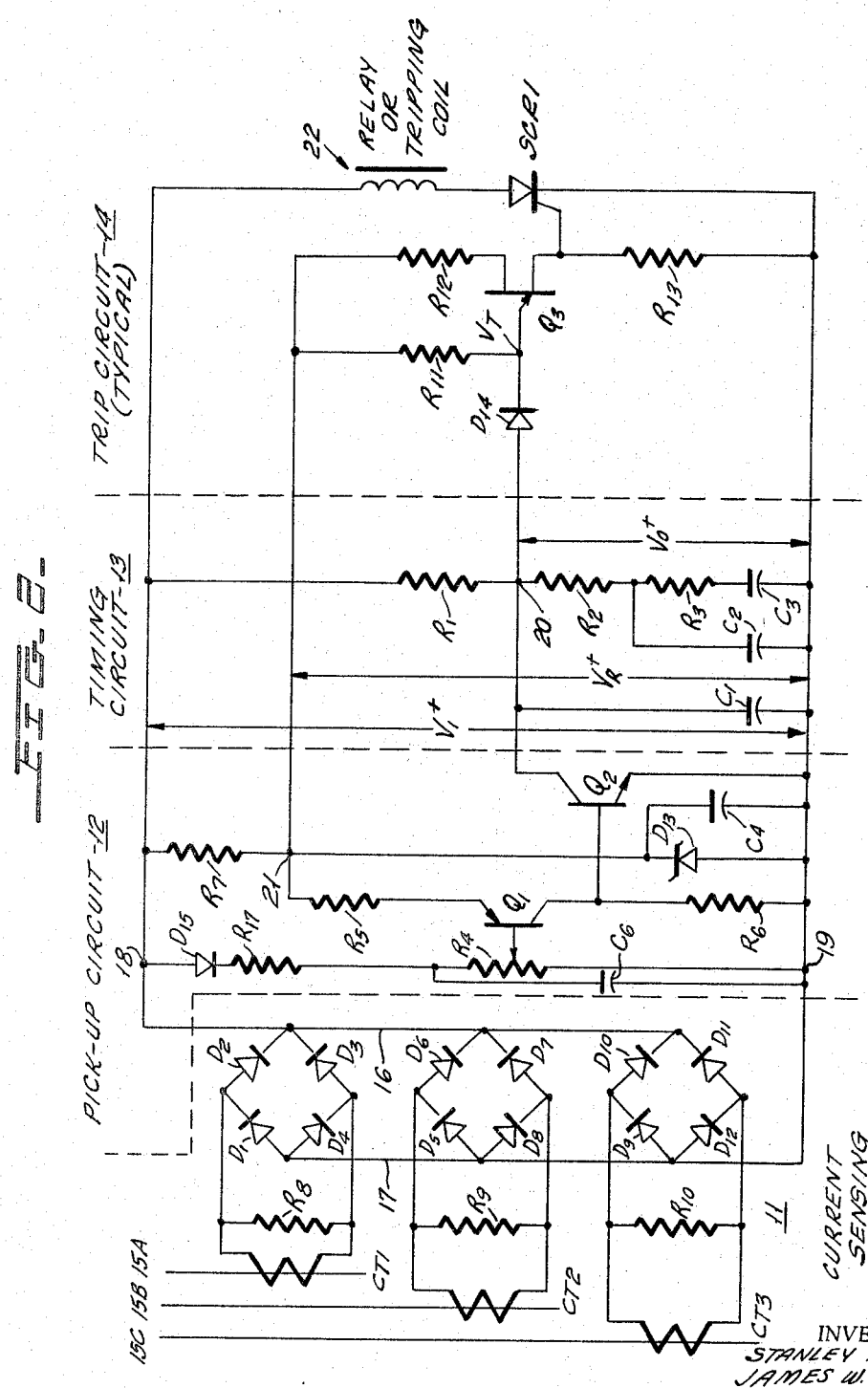

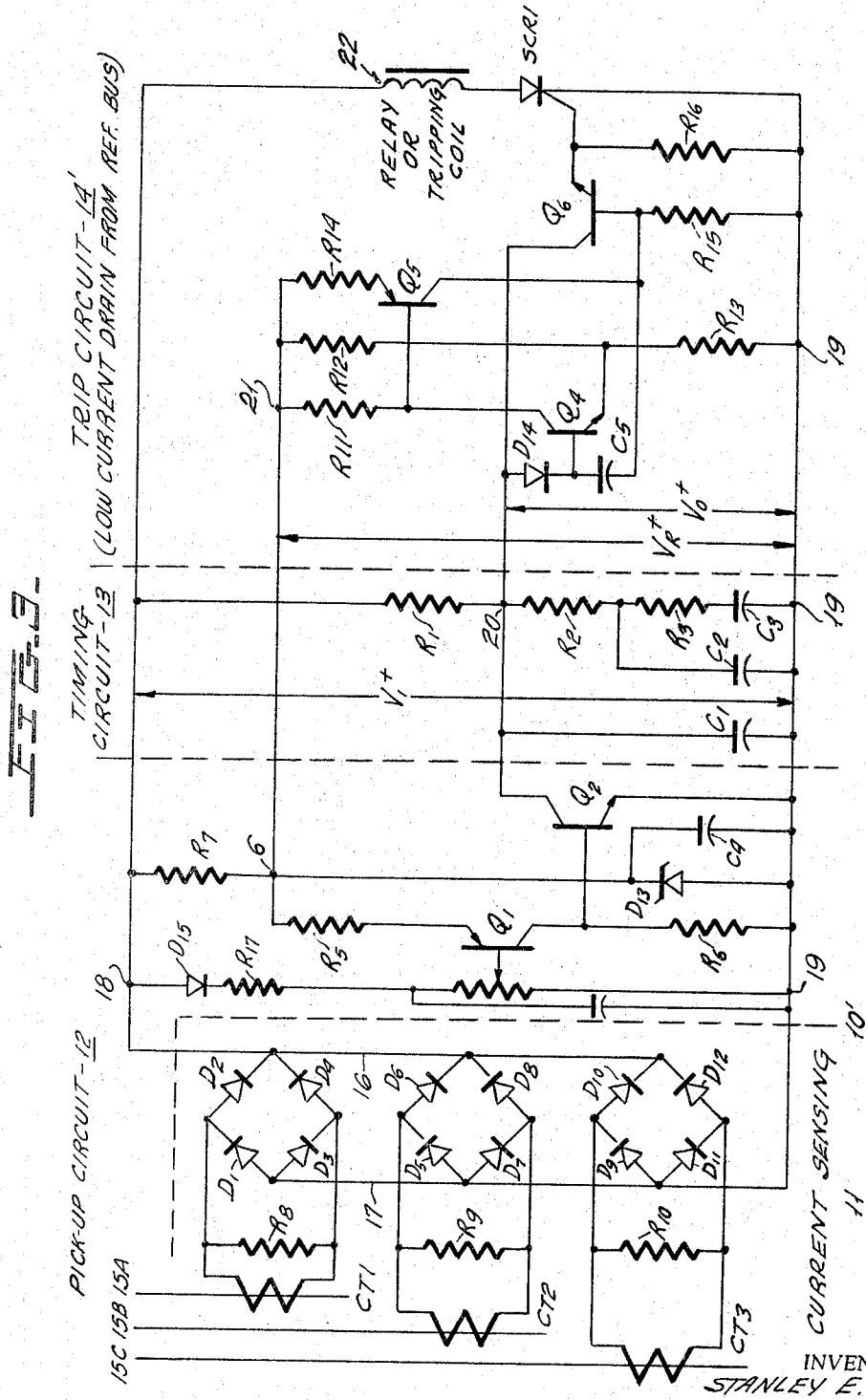

United States Patent Office 3,319,127
Patented May 9, 1967

3,319,127
STATIC OVERCURRENT RELAY
Stanley E. Zocholl, Philadelphia, Pa., and James W. Lipnitz, Cherry Hill, N.J., assignors to I-T-E Circuit Breaker Company, Philadelphia, Pa., a corporation of Pennsylvania
Filed Oct. 12, 1964, Ser. No. 403,208
9 Claims. (Cl. 317—36)

The instant invention relates to sensing devices and more particularly to static means for sensing overcurrent conditions in current carrying circuits in order to initiate automatic protective action before harm may befall the circuit being protected.

The current carrying capacity of a conductor is a function of the temperature rise caused by the current. This temperature rise is a function of current squared and time. This function is of the form of Equation 1:

$$\theta = R_T I^2 R (1 - \epsilon^{-t/T}) \tag{1}$$

where:

$\theta$ is temperature rise.
$R_T$ is the thermal resistance of the conductor.
$I$ is the current.
$R$ is the electrical resistance.
$T$ is the thermal time constant of the conductor.
$t$ is time.

The temperature rise $\theta$ must not exceed a critical temperature $\theta_D$ if damage is to be prevented. Therefore, the maximum time an overcurrent can flow without damage to the conductor is found by setting $\theta$ equal to $\theta_D$ in Equation 1 and solving for time.

This allowable time lag has long been used to coordinate the tripping of circuit breakers in an electrical power system so that the smallest possible portion of the power system is de-energized in clearing a fault.

A simple application of the time delay principle is a radial system in which the breaker closest to the load has the smallest time delay to trip at a given current. The breaker closest to the generator has the longest time delay at the same current.

Circuit breakers have, in the past, been controlled by electro-mechanical relays which have time characteristics which are in general inversely proportional to current. Such relays employ a moving member which is driven by a force which is proportional to current squared. The time lag is obtained by employing some form of viscous damping. This results in a system having the following equation:

$$KI^2 = m\frac{dv}{dt} + Dv \tag{2}$$

where $KI^2$ is the force due to current I.
$m$ is the mass of the moving member.
$D$ is the coefficient of damping.
$v$ is the velocity of the moving member.
$t$ is time.

Solving Equation 2 for velocity (v) gives:

$$V = KI^2 \left(1 - \epsilon^{-\frac{t}{T}}\right) \tag{3}$$

where $$T = \frac{M}{D}$$

Since Equation 3 has the same form as Equation 1, an ideal relay could be constructed if velocity could be sensed. However, the output of the mechanical system is the deflection (x) of the moving member which is the integral of velocity (v).

Where electro-mechanical devices have served well in many applications, they have certain disadvantages. Such devices are subject to false operation or damage due to shock or vibration. Their time-current characteristics are inherent and cannot be altered conveniently. Also devices having moving parts require periodic maintenance and adjustment. In addition, devices having mass have relatively slow reset and poor overshoot characteristics.

The disadvantages of the electro-mechanical system can be overcome by constructing a relay using static components. In such a relay the current measuring, timing and switching are done by means of electrical circuitry.

The instant invention is comprised of delay circuit means which are designed so that their delay characteristics accurately simulate the current rise curve of the circuit to be protected. Thus, for very slight overload conditions the time delay circuit operates so as to take a relatively long time duration before tripping of a circuit protective device such as, for example, a circuit breaker which may be employed to isolate the circuit being protected from its power source. In cases of much more extreme overcurrent conditions the delay period is much shorter with short-circuit current conditions providing instantaneous tripping. Basically, however, the major problem is that of providing an adequate time delay for overcurrent conditions which do not approach the magnitudes of short-circuit currents.

The time delay circuit is coupled to the current carrying conductor to be protected by current transformer means having means to impress a voltage across the time delay circuitry. Since a voltage build-up in the time delay circuit will occur during normal current carrying conditions which may result in a false tripping operation, further means are provided for electrically isolating the time delay circuit from the current transformer means until a predetermined voltage level is achieved at which time the time delay circuit is then electrically coupled to the current transformer means in order to enable the voltage build-up across its output.

When the timing circuit output reached a predetermined magnitude indicative of a tripping operation the output level operates to activate a trip circuit normally provided with a trip coil for activating the circuit protective device such that the trip coil has adequate current to provide a rapid and reliable operation of the protective device.

Some of the circuits forming the static overcurrent relay means, namely the current transformer means, timing circuit, pickup circuit and trip circuit are all energized from the current carrying conductor being protected, thereby requiring no outside voltage source for safe, reliable operation thereof so that the static overcurrent relay means of the instant invention utilizes the current within the current carrying conductor being protected not only to energize the overcurrent relay circuit but further employs the current as the means for tripping the circuit protective device which isolates the conductor being protected from its power source.

With the use of only static components in the overcurrent relay means such as, for example, diodes, transistors, silicon control rectifiers and the like, the operation of the relay circuit does not involve any elements having moving parts which may wear or become unreliable, thus operation is rapid, accurate and reliable over prior art electro-mechanical devices.

It is therefore one object of the instance invention to provide novel static overcurrent relay means for use in protecting current carrying conductors and the like.

Another object of the instant invention is to provide novel static overcurrent relay means employing timing means operable to protect the current carrying conductor by activating circuit protective means before the current carrying conductor can achieve a critical temperature level.

Still another object of the instant invention is to provide novel static overcurrent relay means for use in sensing the condition of current carrying conductors and the like employing timing means which act to simulate temperature build-up in the current carrying conductor and being controlled by pick-up circuit means preventing the operation of said timing means until the current in the current carrying conductor reaches a predetermined magnitude.

Another object of the instant invention is to provide novel static overcurrent relay means for use in sensing the condition of current carrying conductors and the like employing current transformer means for coupling the current carrying conductor to timing circuit means which simulate the temperature rise within the carrying conductor to provide isolation between the current carrying conductor and its power source before a critical temperature level is achieved.

Another object of the instant invention is to provide novel static overcurrent relay means for use in sensing the condition of current carrying conductors and the like employing current transformer means for coupling the current carrying conductor to timing circuit means which simulate the temperature rise within the carrying conductor to provide isolation between the current carrying conductor and its power source before a critical temperature level is achieved and further comprising trip circuit means operable under control of said timing circuit means wherein the power for operating said trip circuit is derived from the current carrying conductor being protected.

Another object of the instant invention is to provide novel static overcurrent relay means for use in sensing the condition of current carrying conductors and the like employing current transformer means for coupling the current carrying conductor to timing circuit means which simulate the temperature rise within the carrying conductor to provide isolation between the current carrying conductor and its power source before a critical temperature level is achieved and further comprising trip circuit means operable under control of said timing circuit means wherein the power for operating said trip circuit is derived from the current carrying conductor being protected and where all components of the static overcurrent relay means are energized by the current carrying conductor.

These and other objects of the instant invention will become apparent when reading the accompanying description and drawings in which:

FIGURE 1b is a plot employed for explaining the operational design of the timing circuit of FIGURE 1a.

FIGURE 2 is a schematic drawing showing a static overcurrent relay means designed in accordance with the principles of the instant invention.

FIGURE 3 is a schematic diagram showing an alternative embodiment to the static overcurrent relay means of FIGURE 2.

Figure 1A:
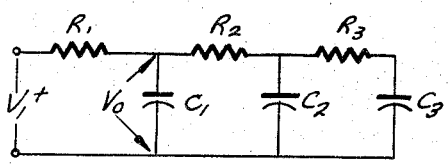
FIGURE 1a is a schematic diagram showing a timing circuit designed in accordance with the principles of the instant invention.

In order to provide an accurate picture of the condition of any current carrying conductor this requires a means for examining the fault current within the conductor at any given instant.

Fault current in a power circuit can be converted to a usable signal level by means of current transformers or shunts. However, the outputs of such devices are proportional to the fault current. In order to have a characteristic described by Equation 1, it would seem that a signal proportional to current squared would be required.

The output of the current transformer could be fed to a non-linear circuit which would attenuate the linear output to produce a squared output. However, in order for the static relay to keep its characteristic over a wide range of fault current, a large primary signal level is required to maintain usable output signal level.

Therefore, the following discussion is given to disclose a linear circuit which gives a close approximation of the characteristics described by Equation 1.

Let primary current I be transformed to voltage $V_1$ by means of a current transformer. Let $V_1$ be fed to a linear circuit being composed of resistors and capacitors. Furthermore, let $V_o$ be the output of the linear circuit. Also, let the desired characteristic be, $$V_o = V_1^2 \left(1 - \epsilon^{-\frac{t}{T_1}}\right) \qquad (4)$$

For values of $t$ much smaller than the time constant $T_1$, Equation 4 reduces to, $$V_o = V_1^2 \left(\frac{t}{T_1}\right) \qquad (5)$$

Now let $V_1 = NV_8$ and $$\frac{T_1}{V_o} = T$$

where N is the per unit input. Making these substitutions Equation 5 becomes:

$$\left(\frac{1}{N}\right)^2 = \frac{t}{T} \qquad (6)$$

Solving for $1/n$ gives $$\frac{1}{N} = \left(\frac{t}{T}\right)^{1/2} \qquad (7)$$

Equation 7 describes a function such that the input, output ratio is:

$$\frac{V_o}{V_1} = \left(\frac{t}{T}\right)^{1/2} \qquad (8)$$

The transient response of the linear circuit to a step function of input is of the general form:

$$\frac{V_o}{V_1} = A_1(1 - \epsilon^{-\alpha_1 t}) + A_2(1 - \epsilon^{-\alpha_2 t}) + A_3(1 - \epsilon^{-\alpha_3 t}) + \ldots (A_m(1 - \epsilon^{-\alpha_n t})) \qquad (9)$$

It can be shown that Equation 9 with a proper value of N, A and $\alpha$ can approximate Equation 8 over a wide range of time ($t$). Such an approximation, where $T = 20$ in Equation 8, is:

$$\frac{V_o}{V_1} = \left(\frac{t}{T_o}\right) \approx 5.52(1 - \epsilon^{-0.05t}) + 0.72(1 - \epsilon^{-t}) + 0.27(1 - \epsilon^{-16.t}) \qquad (10)$$

By taking the Laplace transform of Equation 10 and equating this to the $V_o/V_1$ of the timing circuit of FIGURE 1a the result would yield five independent relations relating the circuit elements $R_1$, $R_2$, $R_3$, $C_1$, $C_2$ and $C_3$ forming the timing circuit. This means that one element of the circuit can be chosen arbitrarily and that the remaining element can be expressed in terms of the known or arbitrarily selected element. This process yields the following relations where $C_1$ is in microfarads:

$$R_1 = \frac{1172}{C_1} K\Omega$$

$$R_2 = \frac{77.2}{C_1} K\Omega$$

$$R_3 = \frac{279}{C_1} K\Omega$$

$$C_2 = 4.66 C_1$$

$$C_3 = 10.2 C_1 \qquad (11)$$

The circuit of FIGURE 1a was derived to give Equation 8 where the time constant T equals 20. T can be changed to any other desired value by changing all the resistors in a fixed ratio. If the circuit has been derived for T equal to $T_1$ and T equal to $T_2$ is desired, simply multiply all the resistances by $(T_2/T_1)$. This means that a convenient time constant adjustment can be accomplished by making $R_1$, $R_2$ and $R_3$ a ganged rheostat or by using tapped resistors.

However, it can be shown that changing only $R_1$ over a range does not seriously affect the curve shape. Consequently, a still more convenient time constant adjustment can be accomplished by making $R_1$ a variable and leaving $R_2$ and $R_3$ fixed.

Figure 1B:
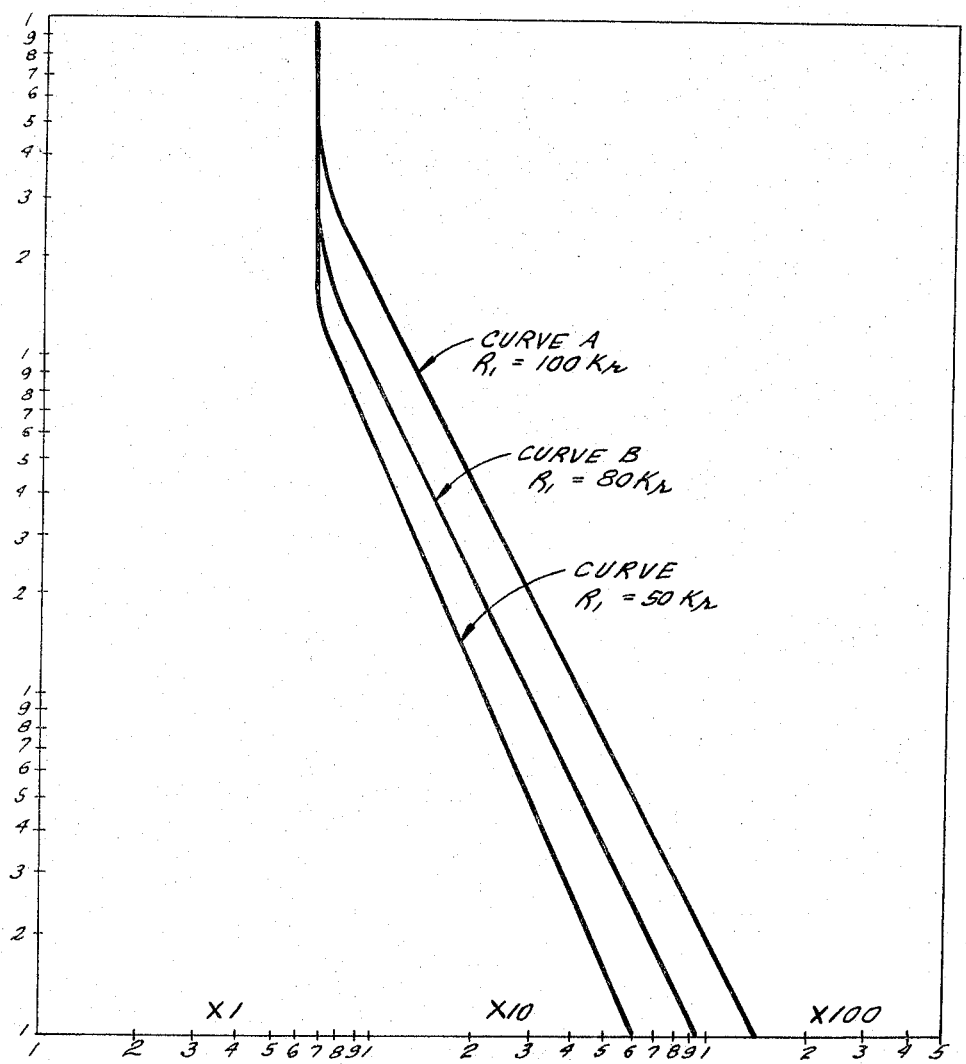

FIGURE 1b shows the curves A, B and C which represent the time-voltage characteristic of the circuit of FIGURE 1a. Curves A, B and C represent the circuit of FIGURE 1a with the value of resistance $R_1$ being chosen at 100,000 ohms; 80,000 ohms; and 50,000 ohms, respectively. The negative slope of the curves A–C indicates that the transient response of the circuit of FIGURE 1a is of the form $(V_o/V_1) = (t/T)^{1/2}$.

The design of the timing circuit of FIGURE 1a forms just one element of a static overcurrent relay means. FIGURE 2 shows a static overcurrent relay means 10 designed in accordance with the principles of the instant invention. The overcurrent relay means 10 is basically comprised of the following sub-components or sections:

A current sensing circuit 11, a pick-up circuit 12; a timing circuit 13; and a trip circuit 14.

In one typical application, the current carrying conductors being protected by the static overcurrent relay means may be the three conductors 15a–15c of a three-phase power distribution system. While the embodiment 10 of FIGURE 2 is shown for use in a three-phase system, it should be understood that its utility may be equally applied in systems of greater or lesser phases. The current sensing circuit 11 of FIGURE 2 is comprised of three current transformers CT1–CT3, each being inductively coupled to one of the three conductors 15A–15C, respectively, such that the conductors 15A–15C act as the primary winding with the secondary windings of the current transformers converting their outputs to voltages across their associated resistors R8–R10, respectively. These fluctuating voltage signals are converted to D.C. signals by means of the three full-wave bridge rectifiers associated with each current transformer, the three-bridge rectifiers being comprised of diodes D1–D4; D5–D8; and D9–D12, respectively. One output point of each of the three-bridge rectifiers is tied to the common bus conductor 16 while the other output terminal of each of the three-bridge rectifiers is connected in common to the common bus 17. Since the outputs of the rectifiers are connected in parallel across the common bus conductors 16 and 17, the largest of the three outputs developed by these three-bridge rectifiers appear across busses 16 and 17 and at terminals 18 and 19, respectively. The voltage appearing across terminals 18 and 19 is labeled $V_1$.

The voltage $V_1$ is impressed across the timing circuit 13 comprised of resistors $R_1$, $R_2$ and $R_3$ and capacitors $C_1$, $C_2$ and $C_3$. The operation of the timing circuit 13 has been explained above such that the timing circuit will develop an output voltage in accordance with the curves shown in FIGURE 1b whereby for given input voltage $V_1$ a predetermined time delay will transpire before the output voltage of the timing circuit will achieve a predetermined voltage level such as, for example, 6.8 volts, as shown in the plot of FIGURE 1b.

With $V_1$ voltage being applied to timing circuit 13 the output $V_o$ taken across terminals 19 and 20 of timing circuit 13 would begin to rise toward some steady state value. In order to prevent the charging of timing circuit 13 during periods when the conductors 15A–15C are carrying normal current loads the pick-up circuit 12 of FIGURE 2 is provided to keep the output voltage $V_o$ equal to zero until the voltage $V_1$ across terminals 18 and 19 attains a predetermined value $V_p$. $V_p$ will be produced by the lowest conductor current which is to operate the relay.

The pick-up circuit 12 is comprised of the series connected resistor and zener diode D7 and D13, respectively, connected across the terminals 18 and 19. Any voltage appearing across terminals 18 and 19 flows through the resistor R7 and zener diode D13. The current in the zener diode D13 establishes a constant voltage $V_R$ between terminals 21 and 19. The capacitor C4 connected across zener diode D13 is provided for the purpose of filtering this voltage.

For proper operation of the pick-up circuit, the base of $Q_1$ must be held at level which represents the peak of the rectified A.C. input. A filter condenser $C_6$ is provided for this purpose. A relatively large value capacitor would be required to accomplish a given level of filtering because the equivalent resistance is made up of all resistance connected to bus 18.

In addition, if the input current were reduced below pick-up before the timing circuit output reaches trip level, the filter capacitor discharge would continue to feed the timing circuit causing an overshoot problem.

A diode D15 is provided in series with C6 which is the filter capacitor. The value of C6 can be small since the equivalent parallel resistance is only that of the potentiometer $R_4$. Now, when the input current drops below the pick-up value, the timing circuit can only discharge. C6 cannot feed its discharge current through D15.

The resistor R17 is used to limit the initial current through C6 to a safe value.

A portion of the voltage $V_1$ developed by the current sensing circuits 11 appears at the output of potentiometer R4 and is applied to the base electrode of transistor Q1. Assuming that the voltage across terminals 19–21 is represented by the symbol $V_R$, it can be seen that the this voltage is applied between emitter and collector of transistor Q1. If the voltage applied to the base electrode of transistor Q1 is less than $V_R$, the current will flow from terminal 21 through resistor R5, the emitter and base electrodes of transistor Q1 and the lower portion of potentiometer R4 to bus conductor 19. Resistor R5 is used to limit the current through Q1 to a safe value. R5 can be eliminated by placing a fixed resistor between the lower terminal of R4 and bus 19.

This causes transistor Q1 to conduct, thereby supplying current to the base electrode of transistor Q2. Q2 now conducts holding the voltage across its terminals 19 and 20 ($V_o$) at virtually zero volts. If the output of potentiometer R4 exceeds a voltage $V_R$, the base to emitter junction of transistor $Q_1$ is reverse biased, consequently no current flows in the collector of transistor $Q_1$ and the base of transistor Q2. In this condition transistor Q2 is turned "OFF" allowing the voltage $V_o$ to rise, i.e., allowing the timing circuit to develop a charge across its capacitive elements.

The resistor R6 connected across the base and emitter electrodes of transistor Q2 is used to provide a path for collector to base leakage current in transistor Q2. Resistor R6 restricts the voltage drop from base to emitter transistor Q2 due to the leakage current at elevated temperatures.

The output $V_o$ appearing across terminals 19 and 20 of timing circuit 13 is applied to trip circuit 14, through diode D14 having its anode electrode connected to terminal 20. The presence of diode D14 prevents the charging of timing circuit 13 from terminal 21 through resistor R11 to terminal 20 of the timing circuit due to the manner in which the diode D14 is connected.

The voltage $V_R$ is impressed across the terminals 21 and 19 of trip circuit 14 and is thereby applied across the series connected elements of resistor R12, the inner base resistance provided by the unijunction transistor Q3 and resistor R13. These elements establish a voltage drop across the terminals 21 and 19 to establish a voltage level $V_T$ at the emitter electrode of unijunction transistor Q3. If the voltage output level $V_o$ of timing circuit 13 is less than the voltage level $V_T$, only a small leakage current can flow across the reverse bias emitter to base junction of unijunction transistor Q3 into the resistor R13. Under these circumstances virtually zero volts appears across resistor R13 and the silicon control rectifier SCR1 receives no gating signal. However, when the voltage $V_o$ exceeds the voltage $V_T$, the emitter to base resistance of unijunction transistor Q3, it rapidly drops to an extremely small value. The current supplied through resistor R11 and diode D14 causes a voltage drop across the resistor R13 which is sufficient to turn on the silicon controlled rectifier SCR1. The major part of the current is supplied through resistive element R11. SCR1 is connected across the terminals 18 and 19 in series with the relay or tripping coil 22. Tripping coil 22, in turn, operates a latch means (not shown) for protective devices such as circuit breakers in order to initiate an automatic tripping or opening operation upon energization of coil 22. It can be seen that the tripping coil 22, as well as all other components of the static overcurrent relay means 10 do not depend on any outside or local voltage sources, but are energized exclusively by means of the current carrying conductors 15A–15C which the overcurrent relay means 10 is designed to protect.

The alternative embodiment 10', shown in FIGURE 3, is comprised of current sensing, pick-up and timing circuits 11, 12 and 13, respectively, which are substantially identical to the circuits 11, 12 and 13 of FIGURE 2. However, an alternative trip circuit 14' is employed in relay means 10' which draws less current in the OFF state.

In the trip circuit 14' of overcurrent relay means 10' the resistive elements R12 and R13 form a voltage divider across the terminals 19 and 21 and are hence supplied with the reference voltage $V_R$. Consequently, that portion of the voltage $V_R$ that is developed across resistor R13 establishes the emitter voltage of transistor Q4. If the timing circuit output voltage $V_o$ appearing across terminals 19 and 20 is less than the voltage across resistive element R13, the base to emitter of junction of transistor Q3 is back-biased when transistor Q3 is turned off. This, however, causes an insignificant rise in the voltage across resistive element R15. As a result, both transistors Q5 and Q6 are turned OFF and the output voltage $V_o$ developed across timing circuit 13 is less than $$VR13/(R13 \div R12)$$

However, when the output voltage $V_o$ exceeds $$VR13/(R13 \div R12)$$

the current flows in the base of transistor Q4, which is now in its conducting state, causing a voltage drop across resistor R11. This voltage drop forward-biases the base to emitter junction of transistor Q5. The resultant base current is limited by the emitter resistor R14. The collector current of transistor Q5 develops a voltage drop across resistor R15, which in turn turns on transistor Q6. The voltage developed across R15 is fed back to the base electrode of transistor Q4 through capacitor C5 to keep transistor Q4 turned ON. With the transistor Q6 conducting, the capacitors of the timing circuit 13 are permitted to discharge into resistor R16 which generates the gating voltage to gate silicon controlled rectifier SCR1 into operation. When the gate voltage threshold level is achieved, SCR1 will fire, energizing the relay or tripping coil 22.

The collector electrode of transistor Q6 is connected to the output of the timing circuit because a fixed amount of charge is available at the terminal 20 when $V_o$ reaches a firing voltage. This connection also discharges the timing capacitors so that they are ready for a new timing cycle if fault current re-appears due to a quick re-closure of the protected circuit connected between the three-phase conductors 15A–15C and the source which supplies power thereto (not shown).

It can be seen from the foregoing that the instant invention provides a completely solid state overcurrent relay means having timing circuit means for simulating the temperature build-up in current carrying conductors so as to provide circuit protection for conductors before they achieve a critical temperature level. The use of static elements provides safe, troublefree operation over an extremely long useful operating life, as well as providing circuit means, using the very current which is to be monitored for the purpose of energizing and hence operating the static overcurrent relay means.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. For use in protecting current distribution networks static overcurrent relay means responsive to overcurrent conditions for operating circuit protective devices after a predetermined time period and before the network is damaged comprising first means for generating a D.C. voltage representative of the current being monitored in said network; second means coupled to said first means for generating a predetermined voltage level after a predetermined time delay; third means coupled to said first means and normally inhibiting the operation of said second means until the output voltage level of said first means achieves a predetermined magnitude; constant voltage reference means coupled to the output of said first means for establishing a second predetermined threshold level; fourth voltage-sensitive switch means coupled to said second means and said constant voltage reference means for energizing a circuit protective device when the output voltage of said second means achieves said second predetermined threshold level.

2. The device of claim 1 wherein said first means is comprised of current transformer means; and full wave rectification means connected across the output of said current transformer means for generating said D.C. voltage.

3. For use in protecting current distribution networks, static overcurrent relay means responsive to overcurrent conditions for operating circuit protective devices after a predetermined time period and before the network is damaged, comprising:
  first means for generating a D.C. voltage representative of the current being monitored in said network;
  second means coupled to said first means for generating a predetermined voltage level after a predetermined time delay;
  third means coupled to said first means and normally inhibiting the operation of said second means until the output voltage level of said first means achieves a predetermined magnitude;
  fourth means coupled to said second means for energizing a circuit protective device when the output voltage of said second means achieves a second predetermined magnitude;
  said first means being comprised of current transformer means, and full wave rectification means connected across the output of said current transformer means for generating said D.C. voltage;
  said second means being comprised of a passive network of resistive and reactive elements for generating the desired time delay substantially in accordance with the equation $$\frac{V_0}{V_1} = \left(\frac{t}{T}\right)^{1/2}$$

where:

$V_o$ is the output voltage of said timing circuit
  $V_1$ is the input voltage to said timing circuit
  $t$ is elapsed time and $$T = \frac{T_1}{V_0}$$

where $T_1$=time constant of the timing circuit.

4. The device of claim 1 wherein said fourth means is comprised of unijunction transistor means coupled to the output of said second means; silicon controlled rectifier means connected to said unijunction transistor means; and trip coil means connected in series with said silicon controlled rectifier means and energizable for activating a protective device.

5. For use in protecting current distribution networks, static overcurrent relay means responsive to overcurrent conditions for operating circuit protective devices after a predetermined time period and before the network is damaged comprising:
  first means for generating a D.C. voltage representative of the current being monitored in said network;
  second means coupled to said first means for generating a predetermined voltage level after a predetermined time delay;
  third means coupled to said first means and normally inhibiting the operation of said second means until the output voltage level of said first means achieves a predetermined magnitude;
  fourth means coupled to said second means for energizing a circuit protective device when the output voltage of said second means achieves a second predetermined magnitude;
  said fourth means being comprised of first and second transistor means coupled to said second means; third transistor means coupled between said first and second transistor means for driving said second transistor means into conduction upon conduction of said first transistor means; feedback means connected between said first and second transistor means for maintaining said first transistor means conductive upon conduction of said second transistor means; series connected trip coil means and silicon controlled rectifier means coupled across said first means; said second transistor means being connected to said silicon controlled rectifier means for energizing said trip coil to operate a protective device.

6. The device of claim 1 wherein said constant voltage reference means is comprised of a series connected zener diode and resistor coupled between the output of said first means and ground potential;
  the common terminal between said zener diode and resistor being coupled to said fourth means.

7. The device of claim 6 wherein said fourth means is comprised of transistor means having first, second and third electrodes, respectively, coupled to said constant reference voltage means common terminal, the output of said second means, and ground potential.

8. The device of claim 1 wherein said second means is comprised of a passive network of resistors and capacitors for generating the desired time delay;
  said resistors being connected in series between first and second end terminals;
  said first end terminal being coupled to said first means;
  a first capacitor being coupled between said second end terminal and ground potential;
  the remaining capacitors each being coupled between a terminal common to two of said resistors and ground potential;
  one of the common terminals between two of said series connected resistors being coupled to said fourth means.

9. The device of claim 8 wherein said second means is comprised of first, second and third series connected resistors and first, second and third capacitors;
  said first resistor having one terminal coupled to said first end terminal;
  said third resistor having one terminal coupled to said second end terminal;
  said second resistor having terminals coupled between the remaining terminals of said first and second resistors;
  one terminal of said second and third capacitors each being respectively coupled to the common terminals between said second and third and said first and second resistors;
  the values of said first ($R_1$), second ($R_2$) and third ($R_3$) resistors being $$R_1 = \frac{1172}{C_3} \times 10^3, \quad R_2 = \frac{77.2}{C_3} \times 10^3, \quad R_3 = \frac{279}{C_3} \text{ ohms,}$$

respectively;
  the values of said first and second capacitors being $C_1 = 4.66$, $C_3$ and $C_2 = 10.2$ $C_3$ microfarads, respectively, where $C_3$ is the value of said third capacitor in microfarads.

References Cited by the Examiner

UNITED STATES PATENTS

| | | | |
|---|---|---|---|
| 2,970,228 | 1/1961 | White et al. | |
| 2,977,510 | 3/1961 | Adamson et al. | 317—36 |
| 3,153,747 | 10/1964 | Sofianek et al. | 317—36 |
| 3,155,879 | 11/1964 | Case et al. | 317—36 |

MILTON O. HIRSHFIELD, *Primary Examiner.*

J. D. TRAMMELL, *Assistant Examiner.*

Disclaimer 3,319,127.—*Stanley E. Zocholl*, Philadelphia, Pa., and *James W. Lipnitz*, Cherry Hill, N.J. STATIC OVERCURRENT RELAY. Patent dated May 9, 1967. Disclaimer filed June 7, 1971, by the assignee, *I-T-E Circuit Breaker Company*.

Hereby enters this disclaimer to claims 1, 2, 6 and 7 of said patent.
[*Official Gazette October 19, 1971.*]